Dec. 8, 1942.                A. H. SNIPES                2,304,286
                     APPARATUS FOR REPAIRING KEYS
                        Filed Feb. 8, 1939            2 Sheets-Sheet 1
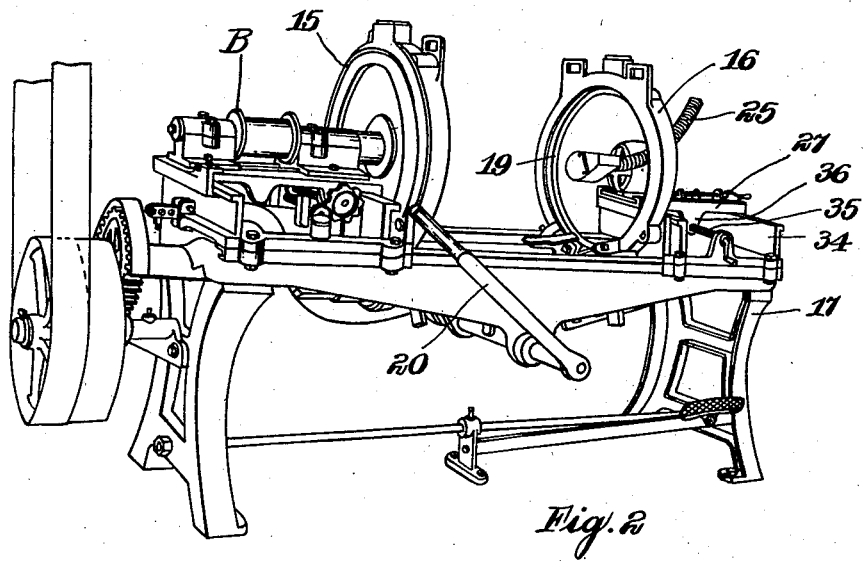
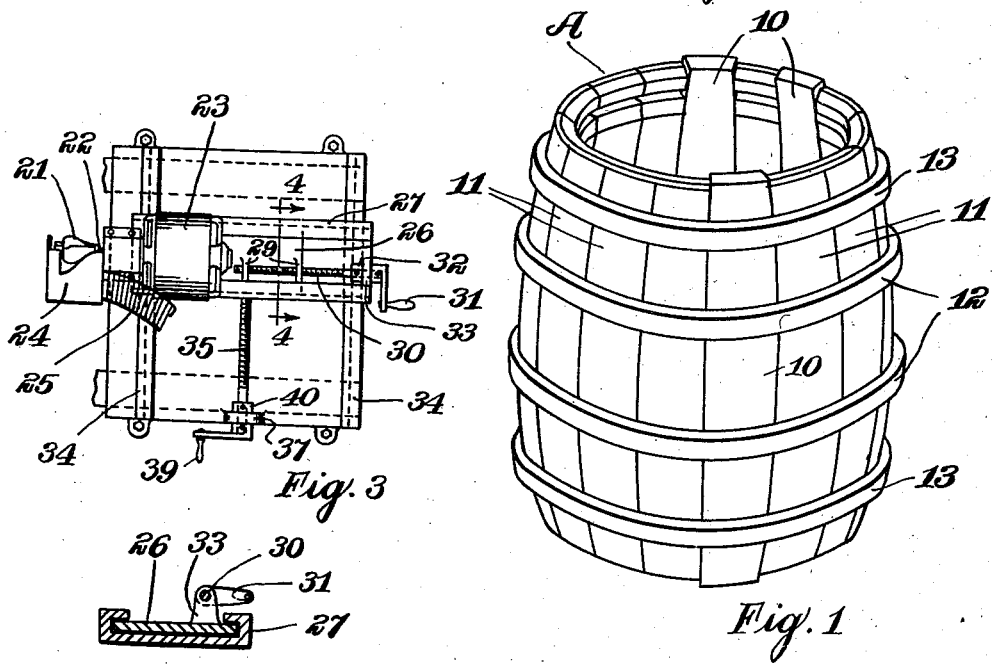
Inventor
Alvis H. Snipes
By Howard Fischer
Attorney Dec. 8, 1942.　　　A. H. SNIPES　　　2,304,286
APPARATUS FOR REPAIRING KEYS
Filed Feb. 8, 1939　　　2 Sheets-Sheet 2

Inventor
Alvis H. Snipes
By Howard Fischer
Attorney

Patented Dec. 8, 1942

2,304,286

UNITED STATES PATENT OFFICE 2,304,286

APPARATUS FOR REPAIRING KEGS

Alvis H. Snipes, St. Paul, Minn.

Application February 8, 1939, Serial No. 255,291

4 Claims. (Cl. 147—16)

My invention relates to an improvement in the method and apparatus for repairing kegs wherein it is desired to provide a method of rebuilding damaged kegs and an apparatus for carrying out this method.

Because of the hard usage to which kegs are often subjected, these kegs become damaged from time to time. When this damage occurs, it is either necessary to discard the keg entirely or to entirely rebuild the same, as the keg is usually intended to contain liquids of one sort or another which would leak from a damaged keg. It will be understood that when a keg is filled with liquid, it is extremely heavy and while the persons handling these kegs are ordinarily skilled in this practice, from time to time one of the kegs will drop and staves will be broken. As this damage usually occurs after a considerable period of use, the shape of the keg and the size of the same may have changed slightly from when it was originally constructed. Furthermore, as the keg is originally formed of a series of staves carefully fitted together to form a keg of the proper diameter, and as the staves are not uniform in width, it is not possible to merely insert a stave of any set size into the keg in repairing the same.

Furthermore, as the staves are all held in place by a series of hoops and as no stave can be removed without first removing these hoops, the keg is entirely disassembled in the repairing process. Because of the fact that the kegs must be entirely disassembled to insert a new stave, it is necessary to reconstruct the keg in its entirety, using the good portions of the old keg and inserting new staves where it is necessary. Because of the variation in sizes, lengths and dimensions of these old kegs, the rebuilding thereof has always been done by hand by coopers particularly trained to do this work. The work is extremely slow and painstaking as the new staves must be cut to the length of the other staves after the keg has been partially assembled, and the chime must be made to agree with that of the other staves, the howel must be of the same diameter as on the other staves and the croze must be cut to a depth to correspond with that in the other staves. The staves are usually made of extremely hard wood, and this hand work requires a considerable amount of time. Often a cooper will require half a day or longer to repair a single keg. This makes the cost of the keg repairing very high and it is difficult to make much of a profit on the work.

The present invention relates to a method of repairing kegs wherein the large portion of the hand work may be eliminated and the new staves may be cut to shape to correspond with the shape of other staves in a very short period of time. It has been found that with my method a considerable number of kegs may be repaired in a day, thus lowering the cost of repairing the kegs and making possible a larger output of repaired kegs.

It is an object of my invention to provide a howeling machine which is equipped with a cutter adjustably mounted on a carriage so that the cutter may be positioned to cut a howel in the end of the new staves which corresponds in shape with the howel on the old staves salvaged from the damaged keg. This howeling machine is designed to rotate the keg past the howeling cutter after the cutter has been adjusted into position by contact with the howel of the old staves. This is not possible with any previously constructed howeling machine with which I am familiar and saves a considerable amount of time as this operation has previously been accomplished on kegs being repaired by means of hand planing tools in order that the howel on the new staves may be cut to the same depth as the howel on the old staves.

It is a further object of my invention to provide a crozing machine which is adjustable to the length and diameter of various kegs and by means of which the croze may be cut at a depth which corresponds with the depth of the croze in the other staves. Because of the fact that the rebuilt keg is provided with staves not containing a croze while all of the remaining staves have been cut to provide a croze, it has in the past been common practice to cut the croze in the new staves with hand planing tools requiring a great deal of time and effort because of the other wood used for the staves. This crozing machine is mounted to rotate about the axis of the keg and may be adjustably positioned in alignment with the croze of the old staves. By a suitable adjusting control, it is possible to move the cutter to the base of the croze in the old staves and with the cutter adjusted to this depth rotate the same through the new staves, the rotating cutter on the device cutting a croze of the proper depth in the new staves.

These and other objects and novel features of my invention will be more clearly and fully set forth in the following specification and claims.

In the drawings forming a part of my specification:

Figure 1 is a perspective view of a partially assembled keg containing a series of old staves and some new staves.

Figure 2 is a perspective view of the howeling machine used to cut the howel in the new staves.

Figure 3 is a plan view of one end of the howeling machine shown in Figure 2, illustrating the manner in which the howeling cutter may be adjusted into position to cut the howel in the new staves to correspond with the howel of the old staves.

Figure 4 is a cross-sectional view through the adjustable bed of the howeling cutter motor, illustrating the construction thereof to disclose how the same may be adjusted.

The keg A is a keg which has been found to contain at least one broken stave and which therefore has been disassembled. After disassembling the keg the staves are all carefully examined and those which contain cracks or any other defects which have shown up through the use of the keg, are discarded and new staves 10 are inserted into the keg in place of these discarded old staves. The new staves 10 are embodied in the keg among the various old staves 11 and the keg wall is assembled into keg form, the various staves 10 and 11 being held together by hoops 12 and 13. Ordinarily, larger hoops 12 are driven onto the keg from both ends thereof to encircle the keg near the center of the same, and smaller hoops 13 are placed to encircle the staves near to but spaced slightly from the ends of the same.

As the staves 10 are assembled into the form illustrated in Figure 1 of the drawings, staves of the proper width and size are selected to take the place of the old discarded staves and care is taken so that the staves fit closely together so that the finished keg will be liquid-tight. As will be seen in Figure 1 of the drawings, the staves 10 when inserted are slightly longer than the other staves 11 as the kegs A vary in length and it is necessary to have the staves 10 sufficiently long to fit properly in any length of keg.

Figure 6:
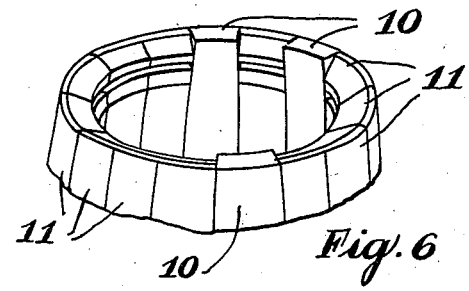
Figure 6 is a perspective view of the top of a keg after the stave sectioned in Figure 5 has been cut to the proper length.
Figure 5:
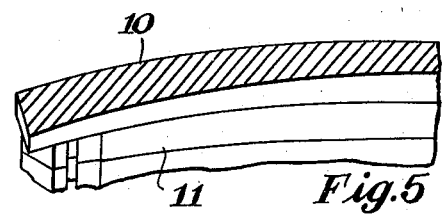
Figure 5 is a longitudinal section through a new stave assembled in a keg showing the relationship of this stave to the remainder of the keg before the stave has been cut to length.

When the keg has been assembled in the manner illustrated in Figure 1 in cross-section, the stave will appear substantially as illustrated in Figure 5 of the drawings. The first action is to cut the stave off to the length of the remaining staves in the keg as illustrated in Figure 6. This figure shows the staves cut to proper length but otherwise not completed. After the staves have been cut to length they are chamfered in any suitable way to provide the chime of the keg 14 to agree with the chime cut on the old staves 11 of the keg. When the chime has been cut it will be found that the staves 10 are thicker at the end than the remaining staves, due to the fact that the staves 11 have been howeled while the new staves 10 have not.

Figure 7:
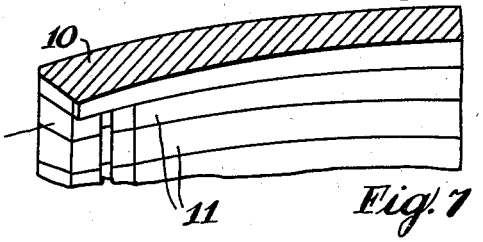
Figure 7 is a section through a new stave assembled in a keg after the chime has been cut by a suitable chamfering device.
Figure 12:
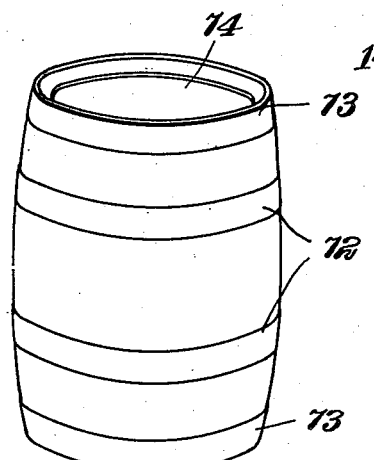
Figure 12 is a perspective view of the keg after the same has been completely assembled.

After completing the operation shown in Figure 7 of the drawings, the keg is placed in the howeling machine illustrated in Figure 2 of the drawings. Each end of the keg fits within a ring 15 or 16 mounted upon the standard 17. The inner surface 19 of each of the rings 15 and 16 is rotatable so that when the rings have been placed to encircle the ends of the keg A, and the rings move together by the clamping lever 20, the keg is firmly supported but is able to rotate about its axis.

After the keg A has been mounted in the crozing machine B in the manner described, the cutter 21 is adjusted to cut a croze of the proper depth in the new staves 10 to agree with the croze of the old staves 11. The cutter 21 is mounted on a shaft 22 rotated by the motor 23 and a guard housing 24 partially surrounds the cutter and is provided with an outlet conduit 25 through which the chips may be drawn by vacuum. Air is sucked through the conduit 25 by any suitable means and virtually all of the wood cut by the cutter 21 is sucked out of the keg through the conduit 25. The motor 23 is mounted upon a plate 26 which is slidable longitudinally of the axis of the keg in a channel-shaped guide 27. A pair of upwardly extending lugs 29 on the plate 26 are internally threaded to accommodate the threaded rod 30 which is rotated by the handle 31. A collar 32 on the shaft 30 prevents the longitudinal movement of the rod 30 in a bracket 33 mounted on the channel guide 27 of the howeling device through which this rod 30 extends. Obviously as the handle 31 is rotated to rotate the shaft 31 the plate 26 bearing the motor 23 will be moved longitudinally with respect to the keg A.

The channel guide 27 is slidably mounted on a pair of transversely extending rails 34 and the channel 27 may be moved transversely by its engagement with the threaded shaft 35. As shown in Figure 2 of the drawings, this shaft 35 extends through a lug 36 depending from the channel guide 27. The rod 35 extends through a bracket 37 on the frame of the machine and is rotated by a handle 39. A collar 40 on the shaft 35 prevents longitudinal movement of the shaft 35 in the bracket 37 so that by rotating the handle 39 the channel guide 27 bearing the plate 26 and the motor 23 together with the cutter supported from the motor may be moved transversely to the axis of the keg.

By means of this adjustable mounting of the howeling cutter it is obvious that the cutter may be moved into engagement with the howel of the old staves 11 so that upon rotation of the keg A the cutter will cut a howel in the new staves 10 which is similar in depth to the howel of the old staves.

Figure 8:
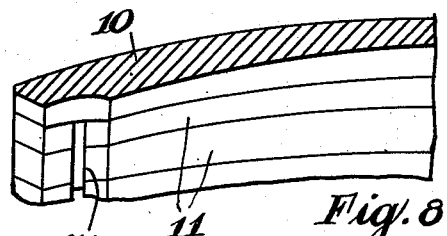
Figure 8 is a section similar to Figures 5 and 7, showing the new stave and its relationship to the old staves after the howel has been cut into the same.
Figure 10:
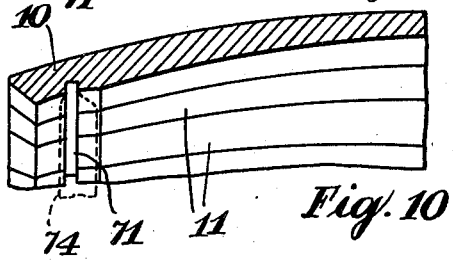
Figure 10 illustrates the shape of the new stave after the croze has been cut in the same, showing the bead of the keg head inserted in this croze.

After this action has taken place the stave 10 appears as illustrated in Figure 8 of the drawings and is shaped similarly to the staves 11 with the exception that the croze has not been cut therein. Accordingly the keg A is then placed upon the crozing machine C indicated in Figure 9 of the drawings in order that the croze may be cut in the new staves.

Figure 11:
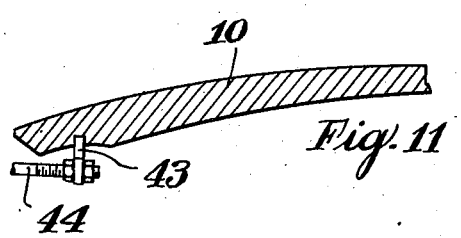
Figure 11 illustrates the croze cutter cutting the croze in the new stave.

The crozing machine C is provided with a base standard or frame 41 which is equipped with arcuated guide plates 42 at either end of the same to engage the surface of the keg A. The cutter 43 which actually cuts the croze is illustrated in Figure 11 mounted upon the shaft 44. The shaft 44 extends into the motor 45 which motor is supported by an arm 46. The arm 46 is pivoted at 47 to a yoke 49 which extends on opposite sides of the motor 45. The opposite side 50 of the yoke 49 forms a handle which is not directly connected to the motor 45. An arm 51, however, is connected to the motor 45 and is provided with an integral handle 52. A rod 53 is pivotally connected at 54 to the handle 52 and arm 51 and extends through a lug 55 integral with the yoke 49. A spring 56 encircles the rod 53 and the tension of the spring may be adjusted by the adjusting nut 57.

Figure 9:
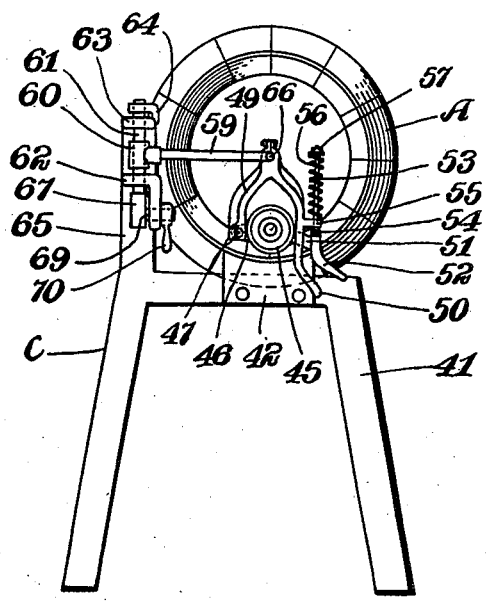
Figure 9 is a front elevation view of my crozing device by means of which croze in the new staves may be cut.

From this description it will be apparent that the motor 45 is normally supported in the position illustrated in Figure 9, the handles 50 and 52 being held separated by the spring 56. By grasping the handles 50 and 52, however, and squeezing the same together, the motor 45 pivots about the pivot 47, lowering the position of the motor 45 with respect to the yoke 49 and increasing the distance between the axis of the keg and the axis of the shaft 44 of the motor upon which the cutter 43 is mounted.

The yoke 49 is pivotally supported at the axis of the keg A by means of a shaft 59 which is bent into alignment with the axis and which extends to one side of the machine and is attached to a T connection 60. The T 60 is secured firmly upon a vertical shaft 61 journaled in a pair of spaced bearings 62 and 63. A stop 64 is fastened to the shaft 61 to engage the vertical frame portion 65 supporting the bearings 62 and 63 to limit the pivoting of the shaft 59 about its axis beyond a desired point. Thus when the arm 59 swings the yoke 49 inwardly, the rod 59 cannot swing beyond the axis of the keg A. The axial extending end 66 of the shaft 59 to which the yoke is pivoted is supported directly above the center of the arcuated plates 42, thus insuring that the keg A is centered transversely. To compensate for kegs larger and smaller in diameter, however, a vertical adjustment of the arm 59 is provided. This vertical adjustment is accomplished by means of a cam 67 on a shaft 69 which extends through a portion of the bearing 62 and which may be operated by an operating handle 70. By rotating the cam 67 the shaft 61 may be raised or lowered, raising or lowering the position of the motor 45. With this adjustment, it is obvious that the end portion 66 of the arm 59 may under heavy condition be placed to coincide with the axis of the keg A.

When the keg A has been placed upon the stand 41, the cutter 43 is adjusted longitudinally with respect to the keg until this cutter is aligned wtih the croze 71 in the old staves. The cam 67 is then actuated to place the end 66 of the arm 59 in alignment with the axis of the keg A. The motor 45 is then started to rotate the cutter 43 and the handles 50 and 52 are squeezed together until the cutter is lowered to the base of the croze 71 in the old staves 11. While the cutter is at this depth the croze may be cut in the new stave or staves 10 and obviously the croze will be at a depth corresponding to the croze in the other staves.

After the staves have thus been shaped, the keg is placed in an assembling machine, the hoops 12 and 13 are removed and a head of the proper size to fit within the croze is placed inside each end of the keg. The staves are then forced together and permanent hoops, such as 72 and 73, are placed to encircle the keg and to clamp the end members 74 securely within the ends of the keg.

In accordance with the patent statutes I have described the principles of operation and construction of my method and apparatus for repairing kegs and while I have endeavored to set forth the best embodiments thereof, I desire to have it understood that this method and apparatus may be changed in an obvious way within the scope of the following claims without departing from the spirit of my invention.

I claim:

1. A crozing machine for crozing kegs having crozed and uncrozed staves therein, comprising an arcuate support engageable with the outer surface of the keg to center the keg with respect to the support, a bracket, means slidably supporting said bracket on said support for sliding movement along a path substantially parallel to the bisecting radius of the arc of said support, a pivot on said bracket coinciding with respect to said bisecting radius and in partaking of the movement of said bracket being adjustable through the center of different sized kegs engaged by said support so that said pivot may be axially aligned with a keg center, a crozing cutter support swingably supported on said pivot to swing about the axis of the keg, a crozing cutter adjustably mounted upon said crozing cutter support and adjustable toward and away from said pivot, said cutter being movable into engagement with the croze of the previously crozed staves to adjust the cutter to the depth of croze of the crozed staves, and means for actuating said cutter as the cutter support is swung about said pivot to croze the previously uncrozed staves to the depth of the crozed staves.

2. A crozing machine for crozing rebuilt kegs including crozed and uncrozed staves, said machine including an arcuate support engageable with the exterior surface of the keg to center said keg with respect to said support, a bracket, means, slidably mounting said bracket on said support for sliding movement along a path substantially parallel to the bisecting radius of the arc of said support to an adjusted position therealong, a pivot on said bracket coinciding with respect to said bisecting radius and slidable with said bracket toward and away from said support, said pivot being thereby movable through the axis of different sized kegs supported on said support so that it may be axially aligned with a keg center, a cutter support swingably mounted on said pivot, a motor adjustably supported on said cutter support movable toward or away from said pivot, a cutter rotatably supported by said motor and adjustable therewith, and means for sliding said bracket and holding said bracket in said adjusted position to thereby move said cutter away from said pivot to adjust said cutter to the depth of croze of the crozed staves of said keg, so that upon swinging the cutter support about said pivot the uncrozed staves may be crozed to the depth of the crozed staves.

3. A crozing machine in accordance with claim 1 wherein said arcuate support is constructed and arranged to support a keg with its axis substantially horizontal, and said path of movement of said bracket being a vertical path.

4. A crozing machine in accordance with claim 2 wherein said arcuate support is constructed and arranged to support a keg with its axis substantially horizontal, and said path of movement of said bracket being a vertical path.

ALVIS H. SNIPES.